United States Patent
Roach et al.

(10) Patent No.: US 10,059,633 B2
(45) Date of Patent: Aug. 28, 2018

(54) PLANT GROWTH-PROMOTING RHIZOBACTERIA INFUSED FERTILIZER

(71) Applicant: Nachurs Alpine Solutions, Marion, OH (US)

(72) Inventors: Tommy Roach, Lubbock, TX (US); Gregory A. Bame, Marion, OH (US)

(73) Assignee: Nachurs Alpine Solutions, Corp., Marion, OH (US)

( * ) Notice: Subject to any disclaimer, the term of this patent is extended or adjusted under 35 U.S.C. 154(b) by 0 days.

(21) Appl. No.: 14/990,488

(22) Filed: Jan. 7, 2016

(65) Prior Publication Data
US 2016/0200636 A1 Jul. 14, 2016

Related U.S. Application Data

(60) Provisional application No. 62/101,252, filed on Jan. 8, 2015, provisional application No. 62/169,519, filed on Jun. 1, 2015.

(51) Int. Cl.

| | | |
|---|---|---|
| *C05F 11/08* | (2006.01) | |
| *C05D 1/00* | (2006.01) | |
| *C05D 9/02* | (2006.01) | |
| *C05C 11/00* | (2006.01) | |
| *C05B 17/00* | (2006.01) | |
| *C05D 5/00* | (2006.01) | |
| *C05C 1/00* | (2006.01) | |
| *C05C 9/00* | (2006.01) | |
| *C05B 7/00* | (2006.01) | |
| *C05B 1/04* | (2006.01) | |

(52) U.S. Cl.
CPC ............... *C05F 11/08* (2013.01); *C05B 1/04* (2013.01); *C05B 7/00* (2013.01); *C05B 17/00* (2013.01); *C05C 1/00* (2013.01); *C05C 9/00* (2013.01); *C05C 11/00* (2013.01); *C05D 1/00* (2013.01); *C05D 5/00* (2013.01); *C05D 9/02* (2013.01)

(58) Field of Classification Search
CPC .. C05B 7/00; C05B 1/04; C05B 17/00; C05C 9/00; C05D 1/00; C05D 9/02; C05D 5/00; C05F 11/08
See application file for complete search history.

(56) References Cited

U.S. PATENT DOCUMENTS

| | | | |
|---|---|---|---|
| 6,228,806 B1 | 5/2001 | Mehta | |
| 6,311,426 B1 | 11/2001 | Mehta | |
| 7,044,994 B2 | 5/2006 | Porubcan | |
| 7,442,224 B2 | 10/2008 | Porubcan | |
| 8,029,593 B2 | 10/2011 | Amy | |
| 2002/0053229 A1* | 5/2002 | Varshovi | C05D 9/00 71/6 |
| 2003/0167811 A1* | 9/2003 | Porubcan | C05B 1/00 71/6 |
| 2011/0082040 A1* | 4/2011 | Trevino | A23K 20/28 504/358 |
| 2012/0255334 A1 | 10/2012 | Gans | |
| 2014/0352376 A1 | 12/2014 | Carpenter | |
| 2015/0239788 A1* | 8/2015 | Yamashita | C05F 11/08 504/101 |

OTHER PUBLICATIONS

PILSOIL 120 "Organic Farming and Gardening" Chapter 7, University of Massachussets Amherst (2007) pp. 1-8 <http://people.umass.edu/psoil120/guide/chapter7.htm>.*
Karthikeyan, V., and S. W. Santhosh. "Study of bacteriocin as a food preservative and the *L. acidophilus* strain as probiotic." Pak J Nutr 8.4 (2009): 335-340.*
Nachurs. Rhyzo-Link 9-15-3 Liquid Fertilizer Information Sheet. Copyright 2014.*
Berry & Fruit Plant Food—Liquid Fertilizer HighTech NPK, Root, Soil, Foliar, Fertiliser—Professional Feed: Amazon.ca Retrieved from https://www.amazon.ca/Berry-Fruit-Plant-Food-Professional/dp/B00M7RFGG2 pp. 1-3. First Available: Jan. 29, 2014.*

* cited by examiner

*Primary Examiner* — Jennifer A Smith

(74) *Attorney, Agent, or Firm* — Law Office of J. L. Simunic; Joan L. Simunic

(57) ABSTRACT

The present invention is a plant fertilizer product comprising at least one organic potassium source and at least one *bacillus* strain of rhizobacteria.

10 Claims, No Drawings

PLANT GROWTH-PROMOTING RHIZOBACTERIA INFUSED FERTILIZER

CROSS-REFERENCE TO PRIOR APPLICATIONS

The present application claims priority to U.S. Patent Application 62/101,252 filed Jan. 8, 2015, and to U.S. Patent Application 62/169,519 filed Jun. 1, 2015, each of which is incorporated by reference in its entirety.

FIELD OF THE INVENTION

The invention relates to a plant fertilizer product comprising at least one organic potassium source and at least one plant growth-promoting rhizobacteria (PGPR).

BACKGROUND OF THE INVENTION

In order to maintain healthy growth, plants must extract a variety of nutrients from the soil in which they grow. However, many soils are deficient in the necessary nutrients or the soils contain the nutrients only in forms which cannot be readily taken up by plants. To counteract these deficiencies, commercial fertilizing products containing select nutrients are commonly applied to soils in order to improve growth rates and yields obtained from crop plants. For example, phosphates may be added to soil to counteract a lack of available phosphorus.

In recent years, the use of plant growth-promoting rhizobacteria (PGPR) in fertilizers has increased. The PGPR colonize the roots of plants following inoculation into the rhizosphere and enhance plant growth. Rhizobacteria are also able to control plant diseases that are caused by other pathogenic bacteria and/or fungi. Disease is suppressed through induced systematic resistance and through the production of anti-fungal metabolites.

For optimum crop production, it is beneficial to use blends of different strains of rhizobacteria. Further, the fertilizer composition with which the PGPR is delivered must be optimized to sustain the PGPR during storage and during use. This is a particular challenge for liquid fertilizer compositions that have a relatively high water content.

SUMMARY OF THE PRESENT INVENTION

The present development is a composition for a commercial fertilizer product comprising at least one organic potassium source and *bacillus*-based plant growth-promoting rhizobacteria (PGPR). The organic potassium is selected from the group consisting of potassium acetate, potassium formate, potassium citrate, potassium succinate, potassium propionate, potassium sulfate, potassium thiosulfate, potassium phosphate, potassium malate, organic sources of potassium, animal manure, and combinations thereof. In a preferred embodiment, the fertilizer of the present invention comprises water, soluble nitrogen, at least one organic potassium source, a phosphate source, a sulfur source, and at least one *bacillus*-based PGPR. In a more preferred embodiment, the PGPR includes at least one *bacillus megaterium* strain and at least one *bacillus licheniformis* strain. Optionally, the fertilizer may comprise metal additives such as boron, calcium, manganese, iron, copper, cobalt, magnesium, molybdenum or a combination thereof.

DETAILED DESCRIPTION OF THE PRESENT DEVELOPMENT

The present development is a composition for a commercial fertilizer product comprising at least one soluble organic potassium source and at least one *bacillus*-based plant growth-promoting rhizobacteria (PGPR). The organic potassium source is selected from the group consisting of potassium acetate, potassium formate, potassium citrate, potassium succinate, potassium propionate, potassium malate, organic sources of potassium, animal manure, and combinations thereof. The *bacillus*-based PGPR is preferably formulated to include strains selected from the group consisting of *bacillus subtilis, bacillus methylotrophicus, bacillus amyloliquefasciens, bacillus megaterium, bacillus pumilus, bacillus oleronius, bacillus marinus, bacillus licheniformis*, and combinations thereof. Optionally, the fertilizer composition of the present invention may comprise water, soluble potassium from inorganic potassium sources, soluble nitrogen, soluble phosphate, sulfur, zinc, boron, calcium, manganese, iron, copper, cobalt, sodium, magnesium, molybdenum, chloride, other strains of PGPR5, inoculants, and combinations thereof. The fertilizer composition may be in granule, pellet, dust, powder, slurry, film, and/or liquid suspension form. Optionally, the fertilizer composition of the present invention is formulated to be storage-stable for at least twelve (12) months.

The soluble organic potassium is combined with the soluble potassium from inorganic sources to deliver available potassium in the final composition of from about 2% to about 20%. Recommended inorganic potassium sources include, but are not limited to, potassium chloride, potassium phosphate, monopotassium phosphate, dipotassium phosphate, tetrapotassium pyrophosphate, potassium hydroxide, potassium sulfate, potassium thiosulfate, and combinations thereof.

If soluble nitrogen is included in the formulation, any soluble nitrogen source known for use in fertilizer products may be used, such as nitrate, ammonia, ammonium hydroxide, ammonium nitrate, ammonium thiosulfate, ammonium salts, amino acids, urea, fish meal or extract, compost extract, kelp extract, shrimp extract, shellfish extract, and combinations thereof. If soluble phosphate is included in the formulation, any phosphate derived from the group consisting of rock phosphate, sodium phosphate, potassium phosphate, phosphoric acid, bone meal, monopotassium phosphate, dipotassium phosphate, tetrapotassium pyrophosphate, orthophosphate, ammonium phosphate, calcium phosphate, potassium phosphate generated by reaction of potassium hydroxide with phosphoric acid, and combinations thereof, may be used.

Sulfur may be added in the form of potassium thiosulfate or as ammonium thiosulfate, although other sulfur sources as are known in the art may be used. Zinc is preferably added as zinc ethylenediaminetetraacetic acid (ZnEDTA). Calcium is preferably added as calcium ethylenediaminetetraacetic acid (CaEDTA). Manganese is preferably added as manganese ethylenediaminetetraacetic acid (MnEDTA). Iron is preferably added as iron ethylenediaminetetraacetic acid (FeEDTA), iron N-(hydroxyethyl) ethylenediaminetriacetic acid (FeHEDTA), Iron ethylenediamine-N, N$^1$-bis (2-hydroxyphenylacetic acid) (FeEDDHA), iron ethylenediamine-di (2-hydroxy-5-sulfophenylacetic acid) (FeEDDHSA), or a combination thereof. Cobalt is preferably added as cobalt sulfate. Magnesium is preferably added as magnesium ethylenediaminetetraacetic acid (MgEDTA), Copper is preferably added as copper ethylenediaminetetraacetic acid (CuEDTA). Boron is preferably added as disodium octaborate tetrahydrate.

The PGPR-infused fertilizer of the present development has a concentration of available potassium of from about 2.0 wt % to about 20.0 wt %, a concentration of the soluble nitrogen source of from about 0.0 wt % to about 12.0 wt %, a concentration of the available phosphorus from the soluble phosphate source of from about 0.0 wt % to about 20.0 wt %, a concentration of sulfur of from about 0.0 wt % to about 4.0 wt %, and a *bacillus* based PGPR added to deliver at least $5\times10^3$ cfu/ml (colony forming units per milliliter of aqueous solution. For the purposes of this writing, the available potassium is defined as the potassium derived from the soluble organic potassium source combined with the soluble potassium from inorganic sources. Optionally, other beneficial organisms, as desired to deliver microbial protective benefits to the crop, may be included in the composition. Water is added to balance the composition.

In a first exemplary embodiment, the source of soluble nitrogen is urea and the soluble nitrogen comprises up to about 12.0 wt % of the composition. In a second exemplary embodiment, the phosphate source includes at least one source of orthophosphate, and the orthophosphate delivers at least 50% of the total available phosphorous. In a third exemplary embodiment, the sulfur is derived from an ammonium thiosulfate 12-0-0-26 blend and comprises from about 0.5 wt % to about 1.5 wt % of the composition. In a fourth exemplary embodiment, zinc is added as zinc ethylenediaminetetraacetic acid (ZnEDTA) and is added to deliver from about 0.20 wt % to about 1.25 wt % zinc to the final composition.

In a preferred embodiment, the composition is prepared by slowly combining water and phosphoric acid in a mix tank at ambient temperature with mixing. After about 15% of the total composition phosphoric acid is added, the potassium source is added to the mix tank as the remaining phosphoric acid and water are added. After the potassium source is added, additional water in the form of aqua is added to the mixture while continuing to add water and the remaining phosphoric acid. Once all the aqua, water and phosphoric acid has been added, the urea is added to the mixture, optionally using agitation. The pH is adjusted to a pH>6, and then the sulfur source is added and blended into the mixture. Potassium acetate is then added and blended into the mixture. The resulting composition is pumped through a filter and heat exchanger, reducing the temperature below 150° F. The inoculants are then added. The composition can then be pumped into a storage tank, packaged and distributed.

The PGPR-infused fertilizer of the present application is preferably used for fertilizing agricultural crops. The fertilizer may be applied by a variety of methods, along with other fertilizers or pesticides or by itself, such as: as a starter or other fertilizer, as an in-furrow treatment, as a foliar fertilizer, as a side-dressed treatment after planting, as a soil injected fertilizer, and for broadcast, soil-injection and fertigation applications. The fertilizer may be used in no-tillage and minimal tillage conditions where it can be injected into the soil, surface dribbled in a band, sprayed between crop rows, or broadcast applied. The fertilizer can be applied with herbicides to reduce the amount of trips over the field thus saving time, fuel and reducing soil compaction.

The PGPR-infused fertilizer of the present application improves crop yield production by an average of approximately 1.5% over the PGPR-infused fertilizer compositions of the prior art. Rhizobacteria viability is a key factor in the ultimate performance of the PGPR-infused fertilizer. Internal studies demonstrate that rhizobacteria viability improves when organic potassium sources and/or thiosulfates are included in the PGPR-infused fertilizer composition.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 40° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A composition comprising potassium acetate and at least one *bacillus*-based plant growth-promoting rhizobacteria and thiosulfate, wherein the composition is a fertilizer.

2. The composition of claim 1 wherein the fertilizer is storage stable for at least twelve months.

3. The composition of claim 1 wherein the *bacillus*-based plant growth-promoting rhizobacteria is added to deliver at least $5\times10^3$ cfu/mL of aqueous solution, wherein the cfu/mL reflects the viable concentration at the time of fertilizer composition preparation.

4. The fertilizer of claim 1 wherein the *bacillus*-based plant growth-promoting rhizobacteria are selected from the group consisting of *bacillus amyloliquefasciens, bacillus licheniformis, bacillus marinus, bacillus megaterium, bacillus methylotrophicus, bacillus oleronius, bacillus pumilus, bacillus subtilis*, or a combination thereof.

5. The composition of claim 1 further comprising soluble nitrogen, wherein the source of the soluble nitrogen is nitrate, ammonia, ammonium hydroxide, ammonium nitrate, ammonium thiosulfate, urea, ammonium salts, amino acids, or a combination thereof.

6. The composition of claim 1 further comprising soluble phosphate, wherein the source of the soluble phosphate is rock phosphate, sodium phosphate, potassium phosphate, phosphoric acid, monopotassium phosphate, dipotassium phosphate, tetrapotassium pyrophosphate, orthophosphate, ammonium phosphate, calcium phosphate, potassium phosphate generated by reaction of potassium hydroxide with phosphoric acid, or a combination thereof.

7. The composition of claim 1 further comprising soluble potassium from potassium formate, potassium citrate, potassium malate, potassium succinate, potassium propionate, organic sources of potassium, or a combination thereof.

8. The composition of claim 1 further comprising sulfur, zinc, boron, calcium, manganese, iron, copper, cobalt, sodium, magnesium, molybdenum, chloride, or a combination thereof.

9. The composition of claim 1 further comprising water.

10. The composition of claim 1 wherein the fertilizer is in granule, pellet, dust, powder, slurry, film, or liquid suspension form.

* * * * *